Nov. 9, 1965  J. D. WATTS  3,216,746
SEALING RING COUPLING
Filed March 29, 1962  2 Sheets-Sheet 1
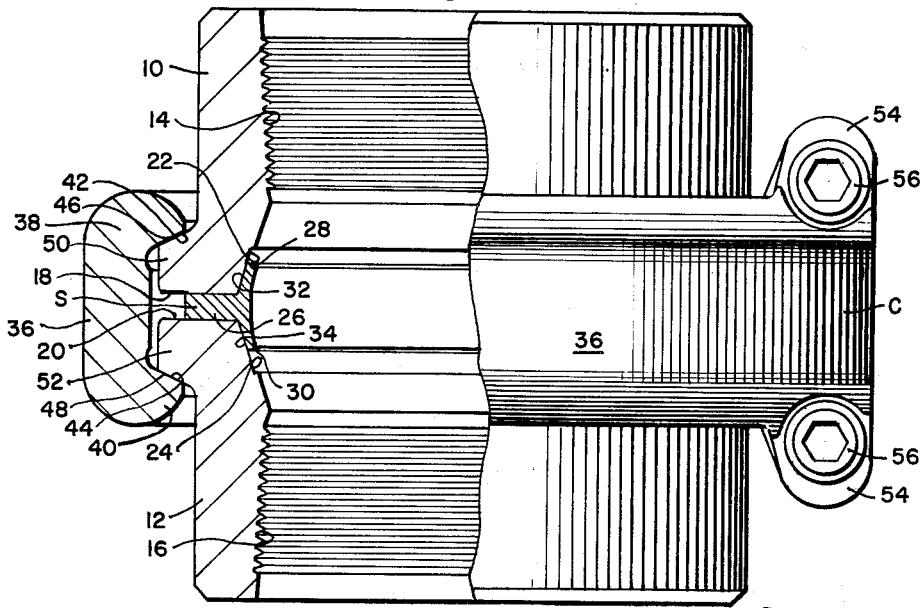
INVENTOR
JOHN D. WATTS
BY Cushman, Darby & Cushman
ATTORNEYS Nov. 9, 1965  J. D. WATTS  3,216,746
SEALING RING COUPLING
Filed March 29, 1962  2 Sheets-Sheet 2

INVENTOR
JOHN D. WATTS

BY Cushman, Darby & Cushman
ATTORNEYS

United States Patent Office 3,216,746
Patented Nov. 9, 1965

3,216,746
SEALING RING COUPLING
John D. Watts, Houston, Tex., assignor to Gray Tool Company, Houston, Tex., a corporation of Texas
Filed Mar. 29, 1962, Ser. No. 186,586
2 Claims. (Cl. 285—110)

This invention relates to couplings and more particularly to improvements in couplings of the type disclosed and claimed in Watts and Hill Patents 2,766,829; 2,766,998; and 2,766,999, all issued on October 16, 1956 and this application is a continuation-in-part of my application Serial No. 61,958 filed October 11, 1960, now abandoned.

The above patents disclose a coupling including two parts to be connected together in sealed relation, such parts as disclosed, preferably constituting oil well parts which may be subjected to excessively high fluid pressures. The parts may be the casing or tubing sections, the control equipment parts utilized in the drilling procedure or the Christmas tree parts utilized in the well completion procedure, all as referred to in the patents. The above-mentioned parts of the coupling have end surfaces adapted to be presented toward one another and a sealing ring of hard metal or the like is interposed between the end surfaces of the parts to effect a fluid tight seal. Each part is provided with an outwardly tapering annular seating surface adjacent the end surface and the sealing ring comprises a flange portion having oppositely disposed flexible lips and a centrally disposed rib portion. The lips are provided with annular seating surfaces which taper outwardly toward the rib portion at an acute angle with respect to the longitudinal axis of the sealing ring. The coupling is completed by the provision of suitable means for drawing the two parts toward one another into sealing engagement with the ring therebetween.

During the movement of the parts toward one another, the rib portion serves to engage the end surfaces of the parts to limit the amount of movement of the parts together. The sealing surfaces on the lips of the sealing ring are arranged to engage and to be deflected by and sealed with the sealing surfaces of the parts. The deflection of the lip surfaces is within the elastic limit of the metal or other material utilized to form the sealing ring and the deflection serves to provide a stored energy which acts to increase the effectiveness of the seal.

In the above arrangement as disclosed in the Watts and Hill patents, the sealing surfaces of the sealing ring are straight in profile and are normally disposed at an angle with respect to the straight profile sealing surfaces of the cooperating coupling parts. Consequently, when these sealing surfaces are brought into engagement there is a constant angular deflection of the lip sealing surfaces, such deflection being about an axis which passes through the juncture between the sealing surface and the adjacent surface of the rib portion.

It has been found desirable in certain circumstances to provide a maximum deflection of the lips while at the same time staying within the elastic limit of the material. Where the entire lip must be deflected at a constant angular rate this added deflection presents difficulties at the above-mentioned juncture. Of course, it is desirable to provide as much stored energy in the completed seal as possible, however, as indicated above the mere provision of additional deflection does not always provide commensurate benefits. Nor is it always desirable to provide the lips with additional thickness or additional length to provide such additional stored energy. These changes not only affect the economics of manufacture, but make the parts heavier and more difficult to work with.

It has been found that the stored energy and effectiveness of the seal can be satisfactorily increased without the addition of thickness or length to the lips or added stress to the above-mentioned juncture by providing the sealing surfaces of the lips with a concave curvature in profile. In this way, the angular deflection of the sealing surfaces increase in a direction toward the extremity of the lip so that a greater stored energy is applied to the extremities of the sealing surfaces where such force is most effective.

An object of the present invention is the provision of a coupling of the type described including a sealing ring having flexible lip means of improved construction, such lip means providing at least one annular sealing surface which is normally concavely arcuate in profile but deflectable by engagement with a cooperating annular sealing surface which is straight in profile into surfaces-to-surface sealing engagement therewith.

Another object of the present invention is the provision of a sealing ring of the type described having an improved flexible lip construction, such construction providing at least one annular sealing surface concavely arcuate in profile which is deflectable by engagement with a cooperating straight annular sealing surface such that the angular deflection of the surfaces increases in a direction toward the extremity thereof.

Another object in conjunction with either of the foregoing objects is the provision of such a curvature to the aforesaid profile that when deflected into sealing engagement, the seal is with uniform pressure throughout.

Another object of the present invention is the provision of a coupling of the type described having improved clamp means including clamp segments for drawing the coupling parts together in response to movement of the clamp segments radially inwardly with respect to each other and improved means disposed within the plane of the outer periphery of the clamp sections for effecting the radially inward movement of the clamp sections.

These and other objects of the present invention will become more apparent during the course of the following detailed description and appended claims.

The invention may best be understood with reference to the accompanying drawings wherein an illustrative embodiment is shown.

In the drawings:

FIGURE 1 is an elevational view partly in vertical section of a coupling embodying the principles of the present invention;

FIGURE 2 is an enlarged fragmentary vertical sectional view showing the sealing ring of the present coupling in sealing engagement in solid lines and its initial position of engagement in dotted lines;

FIGURE 3 is a fragmentary vertical sectional view of one end portion of one of the segmental clamping members;

FIGURE 4 is a fragmentary top plan view showing the cooperating end portions of two adjacent segmental clamping members.

Figure 5:
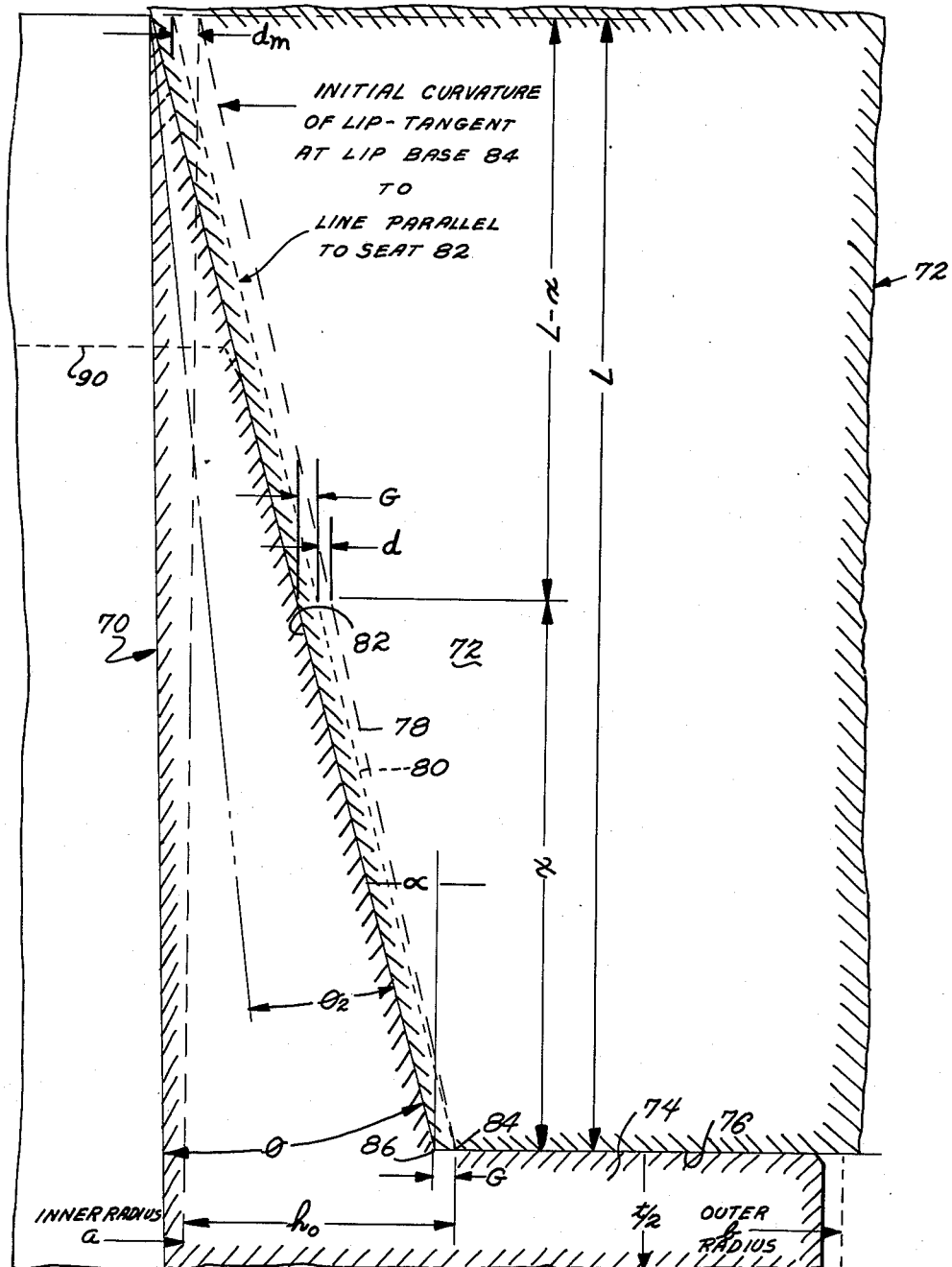
FIGURE 5 is a fragmentary, enlarged vertical section of an embodiment showing mathematical relationships.

Referring now more particularly to FIGURES 1 and 2, there is shown therein a preferred embodiment of a coupling embodying the principles of the present invention. As shown, the coupling includes two conduit parts 10 and 12, each having aligned inside bores 14 and 16 respectively. It will be understood that while the parts 10 and 12 are shown as being of the type adapted to convey fluid under pressure, such parts may be of the type which serve to merely hold fluid under pressure such as container parts or receptacle parts. In such instances one of the parts may simply be a closure member while the other part has a fluid pressure opening therein which is closed at the end opposite from the closure end.

In the embodiment shown, the parts are provided with end surfaces 18 and 20 respectively and have inner outwardly tapering sealing surfaces 22 and 24 respectively adjacent the end surfaces 18 and 20. As shown, the sealing surfaces are provided in the terminal portion of the walls defining the bores 14 and 16.

The coupling of the present invention as shown in FIGURES 1 and 2 embodies a novel sealing ring S, arranged to be interposed between the parts 10 and 12 to provide a sealing engagement therebetween when the end surfaces 18 and 20 of the parts presented toward each other are drawn toward one another by any suitable means, such as a clamping assembly, generally indicated at C in FIGURE 1. The sealing ring S is preferably made of a suitable metal and has an exterior rib 26 which is positioned between the end surfaces 18 and 20 of the parts. Formed integrally with the interior of the rib 26 is an annular flange portion of the ring defining a pair of oppositely disposed flexible lips 28 and 30. The lips provide exterior sealing surfaces 32 and 34 respectively which taper outwardly toward the rib 26. These sealing surfaces are outwardly concavely arcuate in their normal condition, out of cooperating relation with the parts 10 and 12 as indicated in broken lines in FIGURE 2. It will be understood that the showing in FIGURE 2 is greatly exaggerated for purposes of illustration. For example, a preferred deflection at the extremities of the lips would be of the order of 3° of angular movement from the normal relaxed position to the fully deflected condition.

The sealing ring S is preferably made of elastic steel, at least the lip portions are sufficiently elastic so that they may be bent inwardly within the elastic limit of the metal from the position illustrated in dotted lines in FIGURE 2 to that shown in solid lines in FIGURE 2, when the exterior clamps C draw the parts being joined toward one another.

As shown, the clamping assembly C comprises two or more segmental clamping members 36 each having a pair of segmental annular flanges 38 and 40 extending radially inwardly from the sides thereof. The annular flanges are provided with wedging surfaces 42 and 44 which converge inwardly with respect to each other. The wedging surfaces are arranged to engage cooperating wedging surfaces 46 and 48 formed on radially outwardly extending annular flanges 50 and 52 provided on the parts 10 and 12 respectively adjacent their end surfaces 18 and 20. Extending longitudinally outwardly from each end of each segmental clamp member is a pair of oppositely disposed apertured lugs 54 arranged to receive tightening bolt assemblies 56. The lugs 54 are disposed within the plane of the outer periphery of the segmental clamping members. It will be seen that when the bolt assemblies 56 are tightened the segmental clamping members will be moved radially inwardly with respect to each other and due to the engagement of the wedging surfaces, the parts 10 and 12 will be drawn toward one another.

While it is preferred that the sealing ring be made of an elastic hard metal such as steel, it can be made of softer metals such as brass or even of suitable plastics such as Bakelite. However, the elastic steel is preferred, so that when the lips of the ring are bent inwardly within the elastic limit of the metal, they will return to the normal broken-line position of FIGURE 2 when the force is removed so that a particular sealing ring may be re-used.

When the bolts of the clamping assembly are hand-tightened, initial contact is made at points 58 on the outer extremities of the lips of the sealing ring, against the sealing surfaces of the two parts being connected. The acute angle between the horizontal center line of the rib 26 and the point 58 of each of the lips, is somewhat greater than the acute angle between this center line and the sealing surfaces 22 and 24 on the parts. On the other hand, the corner points on the parts, at the outer ends of their sealing surfaces, are in longitudinal alignment with the juncture points 60 on the sealing ring where the sealing surfaces 32 and 34 of the sealing ring join with the flat surfaces of the rib 26.

Accordingly when the two parts are drawn toward one another by the clamping assembly C, the points 58 will be deflected by engagement with the corresponding straight sealing surfaces 22 and 24 of the parts up to the position where the end surfaces 18 and 20 of the parts are brought to a stop when they engage the flat side surfaces of the rib 26, at which time the pairs of engaging sealing surfaces on the lips of the sealing ring and on the ends of the parts are parallel with and flush against one another as shown in solid lines in FIGURE 2. As the seal is completed the lips of the sealing ring are thus flexed inwardly, the angular deflection thereof increasing in a direction toward the extremities of the lips or the points 58. Thus, at the points 60 adjacent the intersections of the sealing surfaces 32 and 34 with the flat side surfaces of the rib 26, the sealing surfaces will have substantially 0° angular deflection, the amount of angular deflection of the sealing surfaces of the lips increasing from 0° at the juncture points 60 to a deflection of approximately 3° at the points 58 at the outer extremities of the lips.

Thus, when the exterior clamp is tightened from its hand-tight position described above to the position shown in full lines in FIGURE 2, the sealing lips of the sealing ring are deflected inwardly. Because this deflection is within the elastic limit of the material from which the lips are made, energy is stored in the lips and they place themselves tightly against the sealing surfaces 22 and 24 of the parts. When the clamp is fully set up, as illustrated in FIGURE 1, the sealing surfaces of the lips are tight and sealingly engage with the corresponding sealing surfaces on the conduit parts, and thereafter, when the union is subjected to pressure, this pressure is exerted outwardly against the inner face of the flange of the sealing ring, to make the sealing action more effective. It will be understood that only a moderate force will be required to be exerted on the nuts of the clamping assembly, in order to deflect the sealing lips inwardly to the position illustrated in FIGURE 2; yet, the union is a completely effective one because the pressure subject area is substantially reduced, and the pressure acts against the flange of the sealing ring, to increase effectiveness of the seal thus formed. With the construction as illustrated, the attendant will always know when he has properly tightened the nuts of the clamping assembly, for it is only necessary that he tighten them until the tightening action is stopped, by the contact of the end surfaces of the parts against the flat faces of the rib of the sealing ring, as shown in FIGURES 1 and 2. Furthermore, it is not possible for the attendant to set up on the bolts of the clamping assembly to a point where the sealing ring would be crushed, for the rib 26 provides a definite stop against excessive make up and subsequent operating loads. The rib 26 of the sealing ring is of such design that at least for small diameter rings, it maintains a substantially constant diameter, and is not drawn substantially inwardly during the clamping action, the only or at least main movement of the sealing ring being the inward bending of the lips thereof, as described.

When the union is tightened, a substantially unitary structure results, the strength of the metal of the ends of the parts serving to back up the sealing ring whereby extremely high pressures may be withstood. The rib 26 of the sealing ring provides increased strength, in order to resist any bursting tendency at the union caused by high fluid pressure which is being handled. The sealing ring is of symmetrical design, so that it is self aligned when placed in position between the ends of the parts.

It will be noted that due to the normal outwardly concave curvature of the sealing surfaces 32 and 34 of the lips, a maximum angular deflection of the outer extremities of the lips within the elastic limit of the metal can be secured without placing undue stress at the juncture points 60. This maximum deflection within the elastic limit of the material achieves a maximum stored energy tending to maintain the seal when the latter is set up. Maximum stored energy results in maximum effectiveness which is thus obtained without sacrificing any of the advantages of the sealing characteristics of the sealing ring disclosed in the above-mentioned Watts and Hill patents, wherein the sealing surfaces of the lips are straight in their normal condition. The present arrangement obtains these improved results without the addition of added thickness or length to the lips which would not only increase the costs involved but would also increase the weight of the parts making them more difficult to work with.

Reference is now made to FIGURE 5 for purposes of explaining the preferred curvature of the outer surface or profile of the lips or lip-like flanges of a sealing ring. In this figure, the cross-sectional view illustrates in full lines the position of the flange 70 when it is in sealing engagement with the annular part 72, the opening of which flares outwardly at a constant seat angle $\alpha$ acute with respect to the longitudinal axis of the opening. In this position, the cylindrical rib 74 is tight against the outer end surface 76 to which the sides of the opening of part 72 flare. The initial position of the sealing ring is shown in dash line with the assumption that rib 74 is in contact at that time with surface 76. However, it will be recalled that this assumption is erroneous from the standpoint that they are not initially in contact, but are drawn into contact by the clamping device. The assumption is made, however, for purposes of illustrating the comparison of the flange positions and configuration before and after make-up. The outer surface 78 of the lip flange initially has a curvature that gradually slopes away from a dash line 80 that is parallel to the straight sealing surface 82 of the part 72, i.e., flares at the same constant seating angle $\alpha$ as does surface 82, but is spaced therefrom a distance G. This latter distance is the amount that the radius of point 84 is larger than the base radius 86 of part 72. In other words, the base of the flange 70 initially has an outer radius 84 that is larger than the radius 86 of the opening of part 72 by a factor G. Line 80 is tangent to the outer surface 78 at point 84.

It has been discovered that in order for the outer surface 78 to be bent so that it will match in straightness the straight seating surface 82 and press thereagainst with uniform pressure, the factor G and the amount of deflection $d$ at any point along the outer surface 78 at any point along its length are related to the yield strength S and modulus of elasticity E of the sealing ring by way of mathematical expressions as follows:

$$G = \frac{2Kh_0S^2}{3LtE} \quad (1)$$

$$d = 2LF\left(\frac{S/E}{\tan\theta}\right) \quad (2)$$

In Equation 1:

$$K = a\left(\frac{b^2+a^2}{b^2-a^2}+\mu\right) \quad (3)$$

In these equations, it will be noted from the drawing that $h_0$ refers to the base depth or radial width of flange 70, while $a$ and $b$ are respectively the inner and outer radii of cylinder 74, the axial thickness of which is designated $t$. $\mu$ refers to Poisson's ratio. In the equation for deflection $d$, it will be noted by reference to FIGURE 5 that $d$ is the radial distance of the curve 78 at any point along its length, from the straight line 80, and this distance is found by varying the term F from zero to one, it being apparent that at the base point 84, $d$ equals zero. At the opposite extreme with F equal to one, and $$\tan\theta = \frac{h_0}{L} \quad (4)$$

the maximum deflection $$d_m = \frac{2L^2S}{h_0E} \quad (5)$$

Term F in the general expression (2) for the deflection $d$ varies generally as a logarithmic function, and specifically is in accordance with the following expression:

$$F = 1 - \left(\frac{L-x}{L}\right)\left(1+\ln\frac{L}{L-x}\right) \quad (6)$$

In other words, for every different value of $x$, which is a variable fraction of L, there is a corresponding value of F, which effects in the general deflection Equation 2 a corresponding radial displacement $d$ between lines 78 and 80 for the instant distance $x$. For convenience, in determining the curve, it may be desirable to let F be as follows:

$$F = 1 - f\left(1+\ln\frac{1}{f}\right) \quad (7)$$

wherein $f$ is the ratio of $L-x/L$. As $f$ is varied then from one towards zero, F varies from zero towards one, and the curvature of the outer surface 78 of the ring flange is thereby defined.

Though flange or lip 70 is illustrated in FIGURE 5 as forming a triangle, it may be truncated as at line 90 so as to be frustrum shaped. In such a case, L in the formulae above still refers to the height of the triangle rather than to the height of the frustrum.

For manufacturing convenience, the same external lip configuration can be used for a given size ring regardless of the material by varying the included lip angle $\theta$, for example to $\theta_2$, to vary $\tan\theta$ directly with the value of $S/E$ for different materials used.

Using formula of the type above referred to removes problems found to be present in many instances when the curvature of lip profile was determined more or less from a trial and error basis. When sealing rings of relatively small diameter are made, there is not too much of a problem with the trial and error method heretofore used in determining the initial lip curvature. However, with ring sizes up to 15 feet in diameter, it is an unfeasible economical risk to proceed completely on a trial and error basis. A ring made in accordance with these formulae causes the amount of force or sealing pressure to be uniform throughout the full area of the sealing surfaces, and takes away the inaccuracies and unknowns heretofore dealt with in making rings on a trial and error basis. The formulae establish workable limits of initially curved lips in relation to a rib section that will have enough resistance to radial compression to attain the desired lip deflection and yet not enough to cause excessive make-up forces, galling pressures, or permanent ring lip deflection caused by excessive bending stresses.

The provision of lugs 54 in the segmental clamping members at a position spaced inwardly of the plane of the outer periphery of the segmental clamping members is particularly advantageous where the coupling of the present invention is utilized in Christmas tree installations or other installations where space is an important factor. The lug arrangement is such that there are no parts in the coupling which extend outwardly at a position beyond that actually required by the strength of the materials being employed. With the lug arrangement shown, a maximum effectiveness is obtained in a minimum space and where space requirements are demanding, such as in Christmas tree installations or the like, the present arrangement has significant advantages.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifica-

I claim:
1. A sealing coupling comprising first and second annular parts having annular end surfaces presented toward one another in coaxial alignment; means defining a conically tapered radially inwardly facing sealing surface on each of said annular parts, said sealing surfaces each extending at an acute angle with respect to the longitudinal axis of said parts and increasing in radius toward said annular end surfaces; said sealing surfaces joining said annular end surfaces at the radially inner extent of said annular end surfaces; an annular sealing ring of hard metal or the like for providing a seal between said parts when they are drawn axially toward one another, said sealing ring comprising a radially inner annular flange portion having a pair of oppositely disposed annular flexible lips and an integral substantially centrally disposed annular rib portion having two oppositely axially facing end surfaces, said lips each having means defining an annular radially exterior sealing surface thereon, each lip joining said rib at the radially inner extent of said rib, the radii of the substantially circular lines defined at the juncture of each lip and said rib being equal to each other, said circular lines being of greater radius than the radii of the substantially circular lines defined at the juncture of the annular part annular end surfaces and annular part annular sealing surfaces when said sealing ring is in an unstressed condition; said sealing ring being positioned between said annular parts, said sealing ring annular sealing surfaces being adapted to be engaged by said annular part annular sealing surfaces and deflected radially inwardly thereby throughout substantially the entire axial extent thereof upon axial movement of said annular parts toward one another; said sealing ring annular lips being elastically deflectable upon said movement from a first position wherein said sealing ring annular sealing surfaces have a concavely arcuate profile to a second position angularly inwardly of said first position wherein said sealing ring annular sealing surfaces are complementarily tapered with respect to said annular part annular sealing surfaces and wherein the radii of said substantially circular lines defined at the juncture of each lip and said rib are substantially equal to the radii of said substantially circular lines defined at the juncture of the annular part annular end surfaces and the annular part annular sealing surfaces, and wherein in said second position said annular part annular sealing surfaces abuttingly engage said rib end surfaces; said flexible lips when deflected to said second position exerting a generally radially outwardly directed sealing force against said annular part annular sealing surfaces, said sealing force being of substantially uniform magnitude per unit area throughout the axial extent of each lip sealing surface; and means for drawing said annular parts axially toward one another to deflect said sealing ring lips from the first position thereof to said second position thereof to effect a seal between said annular parts and said sealing ring.

2. A coupling as defined in claim 1 wherein each of said annular parts includes an exterior annular flange adjacent the annular end surface thereof, the annular flange of each annular part including an annular wedging surface tapering outwardly in a direction toward the flange of the other annular part, and wherein said drawing means comprises a plurality of segmental clamping members each having a pair of segmental flanges extending radially inwardly from the axially spaced sides thereof, each of said segmental flanges having a segmental wedging surface tapering inwardly in a direction away from the other flange, each of said clamping members having a pair of oppositely disposed lugs extending from each angularly spaced end thereof, said clamping members being of a complementary arcuate length to initially extend in substantially circumferentially surrounding relation to said annular flanges of both of said annular parts with the segmental wedging surfaces of said segmental flanges in engagement with the annular wedging surfaces of said annular flanges, the lugs of adjacent ends of adjacent clamping members in substantial alignment; and fastening means engageable between each pair of aligned lugs for drawing said clamping members radially inwardly and hence said annular parts axially toward each other through the interengagement of said wedging surfaces.

References Cited by the Examiner
UNITED STATES PATENTS

| | | | |
|---|---|---|---|
| 1,876,455 | 9/32 | Inshaw | 285—367 |
| 2,717,788 | 9/55 | Raynes | 285—411 |
| 2,766,999 | 10/56 | Watts et al. | 285—367 |

FOREIGN PATENTS

| | | |
|---|---|---|
| 1,020,839 | 12/57 | Germany. |
| 382,169 | 10/32 | Great Britain. |
| 525,073 | 8/40 | Great Britain. |

CARL W. TOMLIN, *Primary Examiner.*